United States Patent [19]

Shine

[11] 4,221,615

[45] Sep. 9, 1980

[54] SOFT-MAGNETIC PLATINUM-COBALT PRODUCTS

[75] Inventor: Carl Shine, Philadelphia, Pa.

[73] Assignee: Fischer & Porter Company, Warminster, Pa.

[21] Appl. No.: 26,813

[22] Filed: Apr. 4, 1979

[51] Int. Cl.² .............................................. H01F 1/00
[52] U.S. Cl. .................................. 148/120; 148/31.55; 148/121
[58] Field of Search ....................... 148/31.55, 120, 121

[56] References Cited

U.S. PATENT DOCUMENTS

| | | | |
|---|---|---|---|
| 3,755,796 | 8/1973 | Griest | 148/31.55 |
| 3,860,458 | 1/1975 | Inoue et al. | 148/120 |
| 3,961,946 | 6/1976 | Makino et al. | 148/31.55 |
| 3,983,916 | 10/1976 | Henmi et al. | 148/120 |
| 3,989,557 | 11/1976 | Henmi et al. | 148/120 |
| 4,002,506 | 1/1977 | Radeloff et al. | 148/120 |
| 4,002,507 | 1/1977 | Radeloff et al. | 148/120 |
| 4,003,766 | 1/1977 | Ito et al. | 148/24 |
| 4,028,144 | 6/1977 | Tomishima et al. | 148/120 |

Primary Examiner—L. Dewayne Rutledge
Assistant Examiner—John P. Sheehan
Attorney, Agent, or Firm—Michael Ebert

[57] ABSTRACT

A technique for producing a non-corrosive platinum-cobalt product having high wear resistance and soft magnetic properties as well as a specular surface. In this technique, a platinum-cobalt composition is solutionized at a temperature above its order-disorder region for a predetermined period and then rapidly quenched to produce a stock piece whose atomic structure is in the disordered state and therefore possesses soft magnetic properties. The piece is then rough-machined to assume the shape of a ball or other product to be formed, the machining action working the outer layer of the rough product and imparting hard magnetic properties thereto. This product is then ground and polished to cause the product to assume its final dimensions and to remove the hard magnetic layer, thereby providing a finished, soft-magnetic product whose surface has specular characteristics and a high order of wear resistance.

8 Claims, No Drawings

SOFT-MAGNETIC PLATINUM-COBALT PRODUCTS

BACKGROUND OF INVENTION

Field of Invention

This invention relates generally to platinum-cobalt alloys, and more particularly to a technique for producing a platinum-cobalt body having soft magnetic and other useful properties.

Magnetic Materials

The pure natural elements which are ferromagnetic are iron, nickel, cobalt and some earth metals. Ferromagnetic materials of value to industry for their magnetic properties are almost invariably alloys of the metallic ferromagnetic elements with one another or with other elements.

Commercial magnetic materials are divided into two main groups: (1) magnetically "soft" materials, and (2) magnetically "hard" materials. The distinguishing characteristic of "soft" magnetic materials is high permeability, these materials being usually employed as cores in the magnetic circuits of electromagnets. "Hard" magnetic materials are characterized by a high maximum magnetic energy product $(BH)_{max}$. These materials are employed as permanent magnets to provide a constant magnetic field when it is inconvenient or uneconomical to produce this field by an electromagnet.

The ferromagnetic properties of platinum-cobalt alloys are of considerable interest and those of an equi-atomic composition are of appreciable industrial significance. The outstanding permanent magnet properties of a 50–50 atomic percent platinum-cobalt alloys are developed by quenching and aging cast material of this composition. At present, equi-atomic platinum-cobalt alloys are capable of providing more powerful permanent magnets than any other material heretofore developed.

Practical Applications

The present invention deals with a technique for imparting to a 50–50 atomic percent platinum-cobalt alloy soft-magnetic and other properties of particular value in oscillating-ball flowmeters.

While platinum-cobalt alloys in accordance with the invention have many other useful practical applications, we shall first, by way of background, briefly describe the structure and operation of an oscillating-ball flowmeter, for the utility of the present invention can best be appreciated in this context.

An oscillating-ball flowmeter, such as that disclosed in the Head et al. U.S. Pat. No. 4,051,723, is capable of accurately measuring and transmitting extremely low flow rates. The meter includes a vertically-positioned flow tube having a ferromagnetic ball therein which is subjected to the force of gravity as well as to the drag force imposed by the upward flow of fluid to be metered. Associated with the flow tube is a position sensor which yields a control signal when the ball lies in a detection zone. The ball is also subjected to a magnetic force produced by an electromagnet energized by a current controller governed by the control signal, which force seeks to displace the ball away from the detection zone. The control signal causes the magnet current to pulse and the ball to oscillate in the flow tube at a frequency which is an inverse function of flow rate, the frequency of the current being indicated to provide a flow rate reading.

In practice, the ball in this meter is generally made of a solid and heavy metal, such as stainless steel, of low retentivity. To detect the position of the ball in the tube, one known technique for this purpose is to direct a light beam toward the ball, the reflection therefrom being intercepted by a photo-detector.

As pointed out in the Head et al. patent, oscillating-ball flowmeters are of value in measuring extremely low liquid flow rates of the type encountered, for example, in industrial plants manufacturing rare chemicals and pharmaceuticals. While stainless steel balls are acceptable in most electromagnetic applications involving the measurement or control of fluid chemicals, such balls are subject to corrosion when the liquids being metered include HCl, $H_2SO_4$, chlorides, phosphoric acid or other constituents reactive with stainless steel.

It is essential in an oscillating-ball flowmeter in which the dimensions and weight of the ball must have a constant value and the surface of the ball must be highly reflective, that these characteristics be maintained in prolonged operation. Profile of flow over the ball surface is impossible if material from the surface of the ball is lost through corrosion or erosion.

Another drawback incident to the use of stainless steel balls is related to the density of this material. The density of stainless steel, which is an alloy steel containing a high percentage of chromium, is relatively low as compared to a platinum-cobalt alloy. Since the range of an oscillating-ball flowmeter depends on the density of the ball—the denser the ball, the greater the range—the existing use of stainless steel balls imposes strict limits on the operating range.

Prior Art

The Henmi et al. U.S. Pat. Nos. 3,989,557 and 3,983,916 disclose cobalt-nobium-iron alloys which are rendered magnetically "semi-hard" by process annealing at a temperature above 900°, followed by cold working.

Tomishima et al. U.S. Pat. No. 4,028,144 renders a Co, Ni, Cr, Fe alloy magnetically semi-hard by hot working the alloy at a temperature above 1000°C., the alloy then being quenched in water, after which the alloy is cold worked. A similar technique to render a cobalt-iron alloy "semi-hard" magnetically is disclosed by Radeloff et al. in U.S. Pat. Nos. 4,002,507 and 4,002,506.

Davis, U.S. Pat. No. 4,003,766, converts a cobalt, aluminum, nickel, iron alloy into the magnetically soft state by heat treatment and quenching to destroy the high retentivity characteristics of this alloy.

The Grist U.S. Pat. No. 3,755,796 and the Inoue et al. U.S. Pat. No. 3,860,458 specifically deal with platinum-cobalt alloys, but the techniques disclosed in these patents produce a magnetic material of high retentive capacity; hence these materials are unsuitable for oscillating-ball flowmeters and similar electromagnetic applications requiring "soft" magnetic properties.

SUMMARY OF INVENTION

In view of the foregoing, the main object of this invention is to provide a non-corrosive, wear-resistant soft magnetic platinum-cobalt body of exceptionally high density, the body possessing a specular surface, whereby when the body is in the form of a ball for inclusion in an oscillating-ball flowmeter, it renders the meter capable of accurately metering the flow rate of highly corrosive liquids throughout a broad range.

While a platinum-cobalt alloy in accordance with the invention has a density more than twice that of stainless steel and is of particular value in ball form, it is to be understood that products formed of this material in other geometric forms are useful in many other applications, such as for inductive aircraft controls in a corrosive medium, electron mirrors requiring corrosion resistance, magnetic alarm systems of the inductive type as well as for floats in variable-area flowmeters.

Briefly stated, a technique in accordance with the invention producing a non-corrosive platinum-cobalt product having high wear resistance and soft magnetic properties as well as a specular surface by solutionizing a platinum-cobalt 50–50 atomic percent composition at a temperature above the order-disorder region for a predetermined period, and then rapidly quenching the solution to produce a stock piece whose atomic structure is in the disordered state and therefore possesses soft magnetic properties.

The stock piece is then rough machined to form a ball or other product having the desired configuration, this machining action working the surface layer of the rough product and imparting "hard" magnetic properties thereto. The rough product is then ground and polished to its final dimensions to remove the "hard" magnetic layer and to provide a soft-magnetic finished product having specular characteristics and a high order of wear resistance.

For a better understanding of the invention as well as other objects and features thereof, reference is made to the following detailed description of a preferred technique in accordance with the invention for manufacturing a soft-magnetic platinum-cobalt product having the desired characteristics.

DETAILED DESCRIPTION OF INVENTION

The physical, chemical and mechanical properties of any alloy are a function of its internal structure. This structure is determined by the chemical composition of the alloy and the mechanical working and heat treating processes to which the metal has been subjected. The effects of processing and heat treatment on metal microstructure can be observed by X-ray diffraction techniques, this being based on the scattering of a beam of X-rays into many beams at definite angles to the original beam by atoms in a regular, orderly arrangement in a crystal.

It is known to produce a hard magnetic platinum-cobalt material by using a 50–50 atomic percent composition, which after being cast, is coldworked, recrystallized and heat-treated to obtain the desired hard magnetic properties.

In this known technique, heat treating acts to produce a strong magnetic state, this being obtained by ordering the atomic structure to create a superlattice. A supperlattice is a space lattice of an alloy system in which each kind of atom tends to occupy definite geometrical positions instead of having a random distribution. The X-ray diffraction pattern is identified by the presence of strong superlattice reflections (001), (110), (002), etc., as well as the disordered structure reflections (111), (200) etc. The microstructure is represented by the presence of grains filled with striations typical of the fully-ordered state.

For electromagnetic devices such as transformers, relays and electric motors in which induced electromagnetic couplings are required, an ordered or "hard-magnetic" platinum-cobalt alloy is not acceptable. Moreover, the permeability being low or at a minimum, gives rise to a strong magnetic retention field which destroys any alternating current effect and renders the material in this state useless. Even a small degree of magnetic retention will interfere with the operation of alternating fields in these applications.

As noted in the background section, the only magnetic condition which is suitable for electromagnetic applications, such as a ferromagnetic ball oscillating in a magnetic field, is one affording maximum permeability and minimum retentivity—that is, a soft magnetic material.

For electromagnetic applications requiring high-corrosion resistance, high wear resistance and a reflective surface, a platinum-cobalt cast composition can be transformed by a technique in accordance with the invention, to a soft magnetic state by a disordering heat treatment. However, one must bear in mind that subsequent working of the heat-treated body will disturb this state.

Step I

In a technique in accordance with the invention, the disordered state is obtained by solutionizing a 50–50 atomic percent platinum-cobalt composition (23 percent cobalt-77 percent platinum, by weight) at a temperature which lies above the order-disorder temperature region. This temperature is best obtained by heating in a range of $850° C. \leqq T \leqq 1000° C.$, for a predetermined period. In practice, this period is about one hour.

Step II

The disordered alloy at the conclusion of the heating period is rapidly quenched into water or oil.

The presence of a completely disordered structure is readily determined by making an X-ray diffraction pattern of the treated alloy and comparing the relative intensities of the disordered/superlattice diffraction peaks. In a completely disordered alloy, the ordered superlattice peaks will have almost completely disappeared. Improper heat treatment will give rise to superlattice peak intensities which are a considerable fraction of the disordered peak intensities and which will also have decreased from their values in the completely disordered state.

Step III

Steps I and II are carried out in a manner producing a cast stock piece in a form appropriate to the ultimate product. Thus where the ultimate product is to be in ball form for use in an oscillating-ball flowmeter, the stock piece takes the form of a cylindrical rod. In other cases, such as for soft-magnetic mirrors, it will be in plate form.

In Step III, this rod is cut into smaller pieces that are then rough-machined into rough spherical bodies or balls which approach the ultimate dimensions of the final product. These machining operations act to coldwork the alloy; for any mechanical working of this type subsequent to the disordering carried out by the previous steps will act to order the skin or outer layer of the balls to increase the ratio of superlattice/disordered diffraction peak intensities and correspondingly decrease the amount of disordering, thereby lowering the permeability of the alloy.

Thus the outer layer of the rough-machined balls have somewhat hard magnetic properties, these being unsuitable for the intended purpose of these balls. An examination of this layer highly magnified under a microscope will reveal an irregular field of metal peaks and troughs which account for the rough surface, these peaks having hard magnetic properties.

Step IV

In this final step, the rough balls are ground and polished to their final dimensions whereby the surface of the finished balls assumes a highly reflective or specular form. This is preferably effected with a diamond slurry. The polishing, in practice, is carried out to grade #25 or better.

This final operation acts to excise the hard magnetic layer from the balls, so that the finished balls have completely soft magnetic properties. The platinum-cobalt balls retain their soft magnetic properties even at very high temperatures. Because the material is very hard, it lends itself to polishing to a point producing a high sheen which is of value in mirrors as well as in balls intended to reflect a light beam.

As noted previously, electromagnetic applications in corrosive media require precise calibration and constancy of weight, as well as interference tolerances. Platinum-cobalt products in the disordered state in accordance with the invention is corrosion resistant to all plain acids HCl, $H_2SO_4$, $HNO_3$, as well as to bases and other reagents in the temperature ranges encountered in oscillating-ball flowmeters. Hence no corrosion is experienced with the physical dimensions and other properties of the balls are maintained in operation.

A non-corrosive platinum-cobalt material having soft magnetic properties in accordance with the invention is also useful in rechargeable storage batteries to accelerate the recharging thereof. In a conventional storage battery having lead plates immersed in a dilute sulphuric acid electrolyte, a layer of lead sulphate is formed on these plates. When the battery is being charged, the layer on the anode plate is transformed into lead dioxide while the cathode is reduced to lead, the electrical energy being thereby converted into chemical energy.

The charging rate of lead-acid batteries is slowed down by polarization associated with a clustering of like charged ions at the plates. This clustering prevents rapid spreading to cover all the reaction sites at the plates and thereby limits the chemical reaction rate. This clustering arises from the limited motion of the ions in the electrolyte which are acted upon only by the horizontal electric field in one direction.

However, the application of a force which imparts vertical motion to the ions acts to decrease the polarization effect; for this force creates a stirring action. It is well known that the application of a magnetic field perpendicular to an electric field acting on ions will impart a vertical component of motion to the ions. This is the electrolytic counterpart to the Hall Effect in semiconductors.

In a storage battery in accordance with the invention, an array of spaced sheets of platinum-cobalt material having soft magnetic properties is immersed in the electrolyte, the sheets being interposed between the lead plates of the battery at right angles thereto. Embedded in the floor of the insulating casing of the battery below the sheets is a solenoid which is energized by the battery voltage. The solenoid, in combination with the soft magnetic sheets or armatures, functions as an electromagnet to establish a magnetic field whose lines of flux are in a direction imparting vertical motion to the charged ions, thereby stirring the ions and accelerating the charging reaction.

While there has been described a preferred embodiment of soft-magnetic platinum-cobalt products in accordance with the invention, it will be appreciated that many changes and modifications may be made therein without, however, departing from the essential spirit thereof.

I claim:

1. A method for producing a corrosion-resistant platinum-cobalt product having high wear resistance, soft magnetic properties and a specular surface, said method comprising the steps of:
   A. solutionizing a platinum-cobalt alloy composition at a temperature above its order-disorder region for a predetermined period;
   B. quenching the solution to produce a stock piece whose atomic structure is in the disordered state and therefore possesses soft magnetic properties;
   C. machining the stock piece to produce a rough product whose body possesses soft magnetic properties and whose outer layer possesses hard magnetic properties as a consequence of the machining action; and
   D. grinding and polishing the rough product to remove the outer layer thereof and to cause the product which is now entirely formed of soft magnetic material to assume its final dimensions, thereby providing the desired finished product.

2. A method as set forth in claim 1, wherein said solutionizing temperature lies in a range of about 800° to 1000° C.

3. A method as set forth in claim 2, wherein said period is about one hour.

4. A method as set forth in claim 1, wherein said stock piece is in the form of a cylindrical rod, and said product derived therefrom is in ball form.

5. A method as set forth in claim 1, wherein said composition is a 50–50 atomic percent platinum-cobalt alloy.

6. A soft-magnetic product resulting from the method set forth in claim 1.

7. A product as set forth in claim 6 having a ball shape.

8. A product as set forth in claim 6 having a plate shape.

* * * * *